(12) United States Patent
Kato

(10) Patent No.: US 7,831,963 B2
(45) Date of Patent: Nov. 9, 2010

(54) METHOD FOR TRACING A PROGRAM EXECUTED ON A SYSTEM COMPRISING A PLURALITY OF PROCESSING UNITS, AND A SYSTEM COMPRISING A PLURALITY OF PROCESSING UNITS

(75) Inventor: Takeharu Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1156 days.

(21) Appl. No.: 11/483,831

(22) Filed: Jul. 10, 2006

(65) Prior Publication Data

US 2007/0226699 A1    Sep. 27, 2007

(30) Foreign Application Priority Data

Mar. 27, 2006    (JP)    .............................. 2006-084407

(51) Int. Cl.
*G06F 9/44*    (2006.01)
(52) U.S. Cl. ..................................................... 717/128
(58) Field of Classification Search ........................ None
See application file for complete search history.

(56) References Cited

U.S. PATENT DOCUMENTS 6,785,773 B2    8/2004    Farago et al.

FOREIGN PATENT DOCUMENTS

| JP | 63-174142 | 7/1988 |
| JP | 05-088935 | 4/1993 |
| JP | 08-286951 | 11/1996 |
| JP | 3714620 | 9/2005 |

OTHER PUBLICATIONS

Japanese Office Action for Japanese Application No. 2006-084407; mailed Jul. 6, 2010.

*Primary Examiner*—Wei Y Zhen
*Assistant Examiner*—Lanny Ung
(74) *Attorney, Agent, or Firm*—Greer, Burns & Crain, Ltd.

(57) ABSTRACT

In a method for tracing a program according to the present invention, a processing unit that executes a program, generates a task control block corresponding to the program based on a tracer storage destination/trace information output destination storage area, which makes a correspondence between the storage destination of a tracer and the output destination of trace information in a primary storage area for each of the plurality of processing units, specifies to output the trace information to a trace information output destination area specified in the task control block when executing the trace process, and executes the tracer specified in the task control block.

5 Claims, 12 Drawing Sheets

| ITEM | CONTENTS |
|---|---|
| NODE ID | IDENTIFIER FOR UNIQUELY IDENTIFYING NODE<br>0 IS NORMALLY SET AS ID OF BOOT NODE |
| LIST OF CPUs INCLUDED IN NODE | LIST INDICATING CPU(s) INCLUDED IN NODE |
| STARTING ADDRESS OF MEMORY AREA INCLUDED IN NODE | STARTING ADDRESS OF MEMORY MODULE MOUNTED IN CORRESPONDING NODE |
| END ADDRESS OF MEMORY AREA INCLUDED IN NODE | END ADDRESS OF MEMORY MODULE MOUNTED IN CORRESPONDING NODE |

FIG. 4

| ITEM | CONTENTS |
|---|---|
| CPU ID | NUMBER INDICATING IDENTIFER SPECIFIC TO CPU |
| NODE NUMBER | NODE IDENTIFIER NUMBER INDICATING NODE WHERE CPU INDICATED BY CPUID IS ARRANGED |
| ADDRESS OF TRACE INFORMATION STORAGE AREA | AREA FOR STORING TRACE INFORMATION OF PROCESS IN CORRESPONDING NODE |
| POINTER TO STORAGE AREA OF TRACER PROGRAM | STARTING ADDRESS OF MEMORY AREA FOR STORING TRACER PROGRAM USED TO RECORD TRACE INFORMATION OF PROCESS ON CORRESPONDING NODE |

F I G. 6

| ITEM | CONTENTS |
|---|---|
| CPUID (CPU NUMBER) | IDENTIFIER (NUMBER) OF CPU RESPONSIBLE FOR TASK |
| NODE ID (NODE NUMBER) | IDENTIFIER (NUMBER) OF NODE TO WHICH CPU HAVING CPUID BELONGS |
| ADDRESS OF TRACE INFORMATION STORAGE AREA | STARTING ADDRESS OF MEMORY AREA FOR RECORDING TRACE INFORMATION |
| POINTER TO STORAGE AREA OF TRACER PROGRAM | STARTING ADDRESS OF AREA FOR STORING TRACER PROGRAM EXECUTING TRACE PROCESS |

F I G. 8

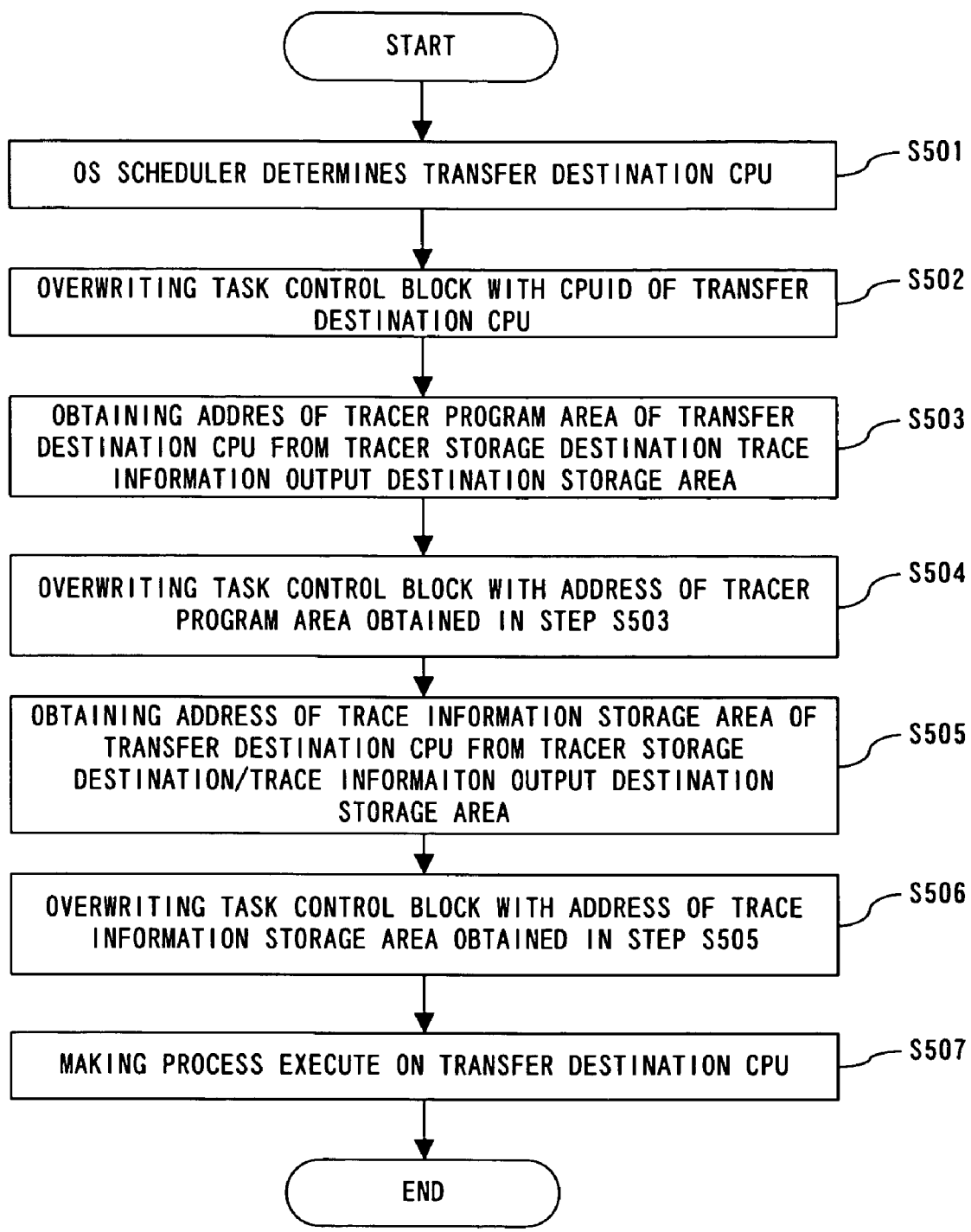
F I G. 1 2

METHOD FOR TRACING A PROGRAM EXECUTED ON A SYSTEM COMPRISING A PLURALITY OF PROCESSING UNITS, AND A SYSTEM COMPRISING A PLURALITY OF PROCESSING UNITS

BACKGROUND OF THE INVENTION

1. Field of the Invention

The present invention relates to a method for tracing a program executed on a system comprising a plurality of processing units, and a system comprising a plurality of processing units.

2. Description of the Related Art

A technique for tracing the operations of an operating system (OS), or the operations of a program running on the OS is known. By way of example, for Linux, LKST (Linux Kernel State Tracer), or LTT (Linux Trace Toolkit) is well known as a tracer of an event within a kernel of Linux.

In the meantime, a system comprising a plurality of CPUs (Central Processing Units), such as an SMP (Symmetric Multiple Processor) system or an NUMA (Non Uniform Memory Access) system is known.

In the NUMA system, one or more CPUs and a memory module are arranged on each node (CPU board).

In the conventional NUMA system, an area for storing trace information is secured within a memory module of a specific node. For example, as shown in FIG. 1, if a node of a CPU which is executing a trace process is different from that of a memory module where the area for storing trace information is secured, a memory access between the nodes must be made, leading to an increase in the overhead of the access. Accordingly, if an interrupt caused by another process having a higher priority, which uses the bus between the nodes, occurs after the memory access between the nodes starts, the process having the higher priority must be made to wait.

Additionally, Patent Document 1 discloses a technique for verifying cache coherency in an NUMA system comprising a plurality of nodes.

[Patent Document 1] United States Patent Publication No. U.S. Pat. No. 6,785,773 B2 "Verification of Global Coherence in a Multi-Node Numa System"

SUMMARY OF THE INVENTION

An object of the present invention is to provide a trace method, which can reduce a load on a bus between nodes when the operations of an operating system or a program are traced in an NUMA system, for a program executed in the NUMA system, and to provide an NUMA system.

Another object of the present invention is to provide a trace method, which can continue to reduce a load on a bus between nodes even if a task is transferred when the operations of an operating system or a program are traced in an NUMA system, for a program executed in the NUMA system, and to provide an NUMA system.

A trace method in a first aspect of the present invention, is a method for tracing a program executed on a system having a plurality of nodes, which are interconnected by a bus and each of which is configured by one or more processing unit(s) and a primary storage area, to which each of the one or more processing unit(s) makes an access when executing a trace process. A processing unit that executes the program generates a task control block corresponding to the program based on a tracer storage destination/trace information output destination storage area, which makes a correspondence between a storage destination of a tracer and an output destination of trace information in a primary storage area for each processing unit. And the processing unit that executes the program, specifies to output the trace information to a trace information output destination area specified in the task control block when executing the trace process, and executes the tracer specified in the task control block.

Here, the task control block is generated based on the tracer storage destination/trace information output destination storage area, which makes a correspondence between the storage destination of the tracer and the output destination of the trace information in the primary storage area for each processing unit. Each processing unit sets the storage destination of the tracer and the output destination of the trace information in a memory module of the node of the processing unit itself, makes specification to output the trace information to the trace information output destination area specified in the task control block when executing the trace process, and executes the tracer specified in the task control block, whereby an access between the nodes, which occurs with the execution of the trace, can be prevented from arising, and a load on the bus between the nodes can be reduced.

A trace method in a second aspect of the present invention is a method for tracing a program executed on a system having a plurality of nodes, which are interconnected by a bus and each of which is configured by one or more processing unit (s) and a primary storage area, to which each of the one or more processing unit(s) makes an access when executing a trace process. A processing unit that executes the program generates a task control block corresponding to the program based on a tracer storage destination/trace information output destination storage area, which makes a correspondence between a storage destination of a tracer and an output destination of trace information in a primary storage area for each processing unit. And a transfer source processing unit that is responsible for a task, rewrites a responsible processing unit to a transfer destination processing unit for the corresponding task control block, and also rewrites the storage destination of the tracer and the output destination of the trace information to a storage destination and an output destination, which correspond to the transfer destination processing unit, when a transfer of the task is determined.

Here, the task control block is generated based on the tracer storage destination/trace information output destination storage area, which makes a correspondence between the storage destination of the tracer and the output destination of the trace information in the primary storage area for each processing unit. Each processing unit sets the storage destination of the tracer and the output destination of the trace information in a memory module of the node of the processing unit itself, and at the same time, the transfer source processing unit that is responsible for a task rewrites a responsible processing unit to the transfer destination processing unit for the corresponding task control block, and also rewrites the storage destination of the tracer and the output destination of the trace information to a storage destination and an output destination, which correspond to the transfer destination processing unit, when the transfer of the task corresponding to the program is determined, whereby an access between the nodes, which occurs with the execution of the trace, can be prevented from arising, and a load on the bus between the nodes can continue to be reduced even after the task is transferred.

An NUMA system in a third aspect of the present invention is a system having a plurality of nodes which are interconnected by a bus and each of which is configured by one or more processing unit(s) and a primary storage area, to which each of the one or more processing unit(s) makes an access when executing a trace process, wherein: an area to which trace information is output, and an area for storing a tracer that executes a trace are provided in the primary storage area comprised by each of the plurality of nodes; a tracer storage destination/trace information output destination storage area, which makes a correspondence between a storage destination of the tracer and an output destination of the trace information in the primary storage area corresponding to each of the trace processing units, is further provided in a primary storage area of a predetermined node among the plurality of nodes; a processing unit that is responsible for a task writes information for identifying the responsible processing unit itself, and the storage destination of the tracer and the output destination of the trace information, which correspond to the responsible processing unit itself, to a task control block based on the tracer storage destination/trace information output destination storage area when the task control block of the program to be traced is generated; the responsible processing unit obtains the storage destination of the tracer and the output destination of the trace information from the task control block of the program when the program to be traced is executed; and the responsible processing unit fetches and executes the tracer from the obtained storage destination of the tracer, and outputs the trace information to the obtained output destination.

An NUMA system in a fourth aspect of the present invention is a system having a plurality of nodes which are interconnected by a bus and each of which is configured by one or more processing unit(s) and a primary storage area, to which each of the one or more processing unit(s) makes an access when executing a trace process, wherein: an area to which trace information is output, and an area for storing a tracer that executes a trace are provided in the primary storage area comprised by each of the plurality of nodes; a tracer storage destination/trace information output destination storage area, which makes a correspondence between a storage destination of the tracer and an output destination of the trace information in the primary storage area corresponding to each of the plurality of processing units, is further provided in a primary storage area of a predetermined node among the plurality of nodes; a processing unit that is responsible for a task writes information for identifying the responsible processing unit itself, and the storage destination of the tracer and the output destination of the trace information, which correspond to the responsible processing unit itself, to a task control block based on the tracer storage destination/trace information output destination storage area when the task control block of the program to be traced is generated; and a transfer source processing unit that is responsible for the task rewrites a responsible processing unit to a transfer destination processing unit for the corresponding task control block, and also rewrites the storage destination of the tracer and the output destination of the trace information to a storage destination and an output destination, which correspond to the transfer destination processing unit, when a transfer of the task is determined.

According to the present invention, a load on a bus between nodes can be reduced when the operations of an operating system or a program are traced in an NUMA system.

BRIEF DESCRIPTION OF THE DRAWINGS

FIG. 4 is a schematic showing the data structure of an NUMA management table;

FIG. 6 is a schematic showing the data structure of a tracer storage destination/trace information output destination storage area;

FIG. 8 is a schematic showing the data structure of a task control block;

FIG. 12 is a flowchart showing a process executed in correspondence with the determination of a transfer of a process.

DESCRIPTION OF THE PREFERRED EMBODIMENTS

Preferred embodiments according to the present invention are hereinafter described in detail with reference to the drawings.

An NUMA system is a system that can comprise a plurality of nodes. Namely, the NUMA system is configured by one or more nodes. Each of the nodes is configured by mounting one or more CPUs on a board along with a memory module.

Figure 1:
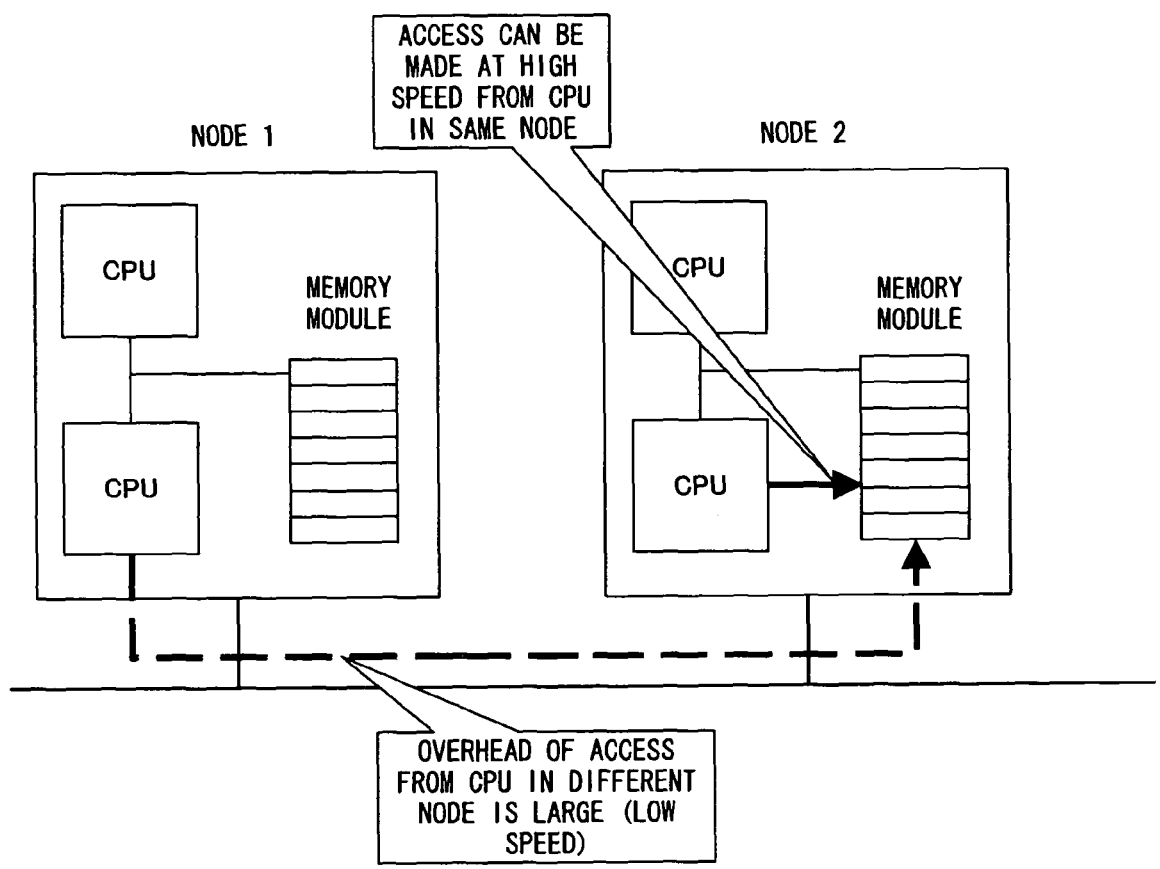
FIG. 1 is a schematic explaining a problem of a conventional NUMA system.
Figure 2:
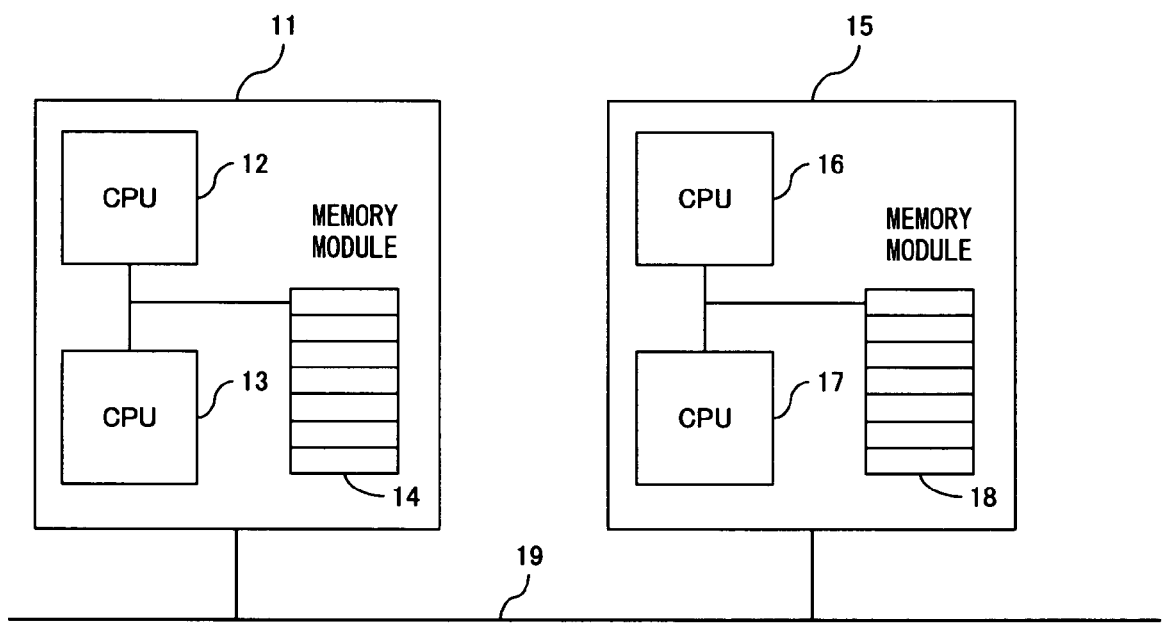
FIG. 2 is a diagram showing the configuration of an NUMA system according to a preferred embodiment of the present invention.

FIG. 2 is a diagram showing the configuration of an NUMA system according to a preferred embodiment of the present invention.

In this figure, nodes 11 and 15, each of which is configured by mounting two CPUs on a board along with a memory module, are interconnected by a bus 19.

Namely, the node 11 is configured by the CPUs 12 and 13 and the memory module 14, whereas the node 15 is configured by the CPUs 16 and 17 and the memory module 18.

Any of the nodes in the NUMA system, for example, the node 11 is determined as a node where a BOOT CPU to be described later exists. In the memory module 14 of the node 11, for example, a task management mechanism, a list of task control blocks generated by the task management mechanism, and a tracer (an original at a copy source), which is a program executing a trace, exist.

Figure 3:
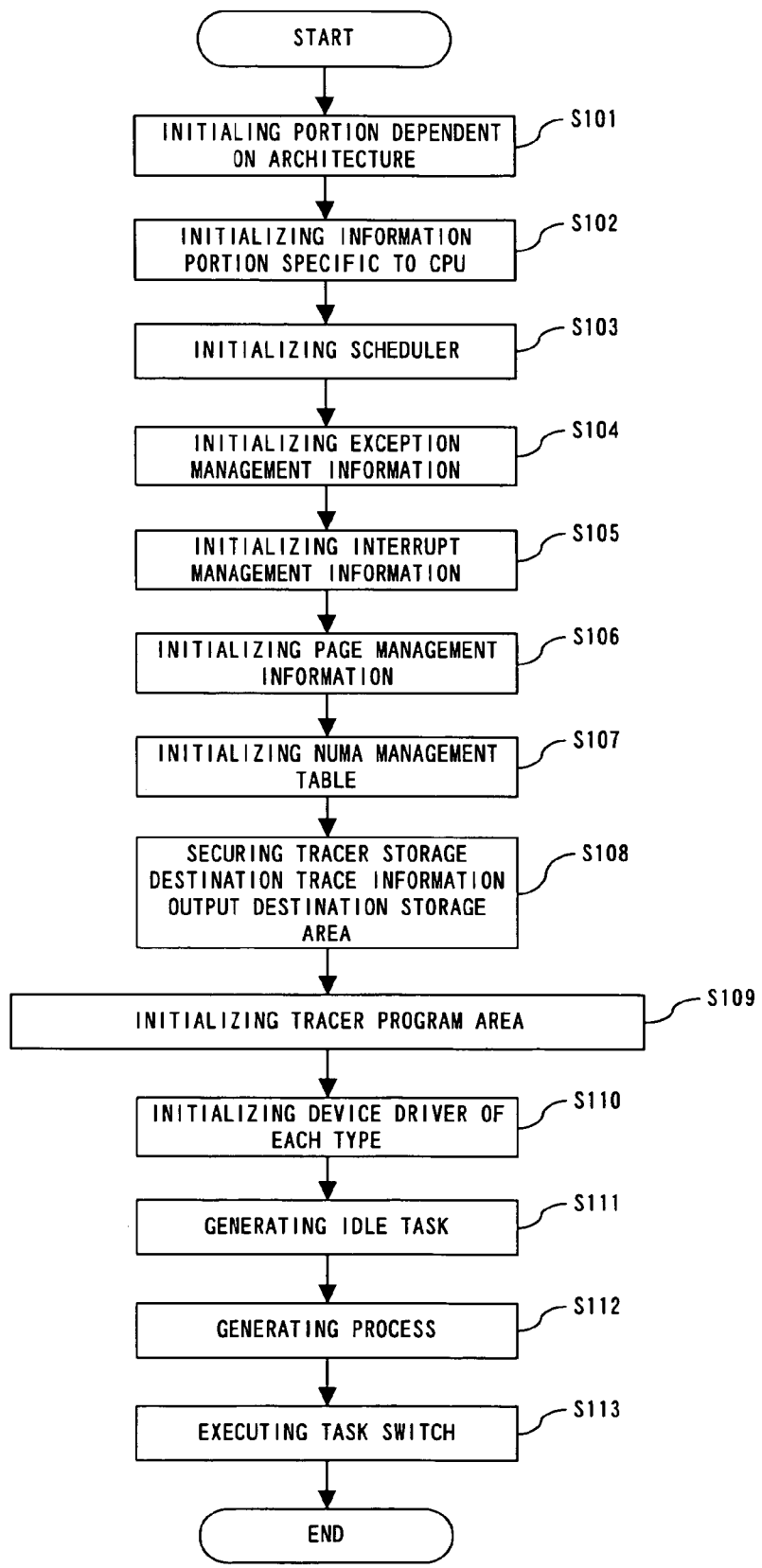
FIG. 3 is a flowchart showing an initialization process of the NUMA system.

FIG. 3 is a flowchart showing an initialization process of the NUMA system.

In this figure, firmware determines one of the plurality of CPUs, which configure the NUMA system, as a CPU that executes a boot process when the system is powered on. This CPU is hereinafter referred to as a BOOT CPU.

The BOOT CPU initializes a portion dependent on an architecture in step S101. In this step, available capabilities are obtained based on the memory capacity of the system, the name of a maker of each of the CPUs of the system, and a version number. Additionally, the BOOT CPU makes an inquiry to the firmware, whereby memory layout is examined.

Next, in step S102, the BOOT CPU sets information for using the obtained capabilities.

Then, in step S103, the BOOT CPU initializes a scheduler that allocates a CPU to a process (referred to also as a job or a task) (manages a process). Namely, the data structure required to manage a process is initialized.

In step S104, the BOOT CPU sets the position of a memory, which corresponds to an exception (such as a trap, etc.).

In step S105, the BOOT CPU initializes a table for managing the position of a memory for an interrupt issued by a device.

In step S106, the BOOT CPU initializes page management information for allocating a memory to a process in units of pages.

In step S107, an NUMA management table is initialized. In this step, the BOOT CPU secures the area of the NUMA management table in a memory of a node to which the BOOT CPU belongs, and the BOOT CPU and the other CPUs comprised by the system write information about the CPUs themselves to the NUMA management table.

As shown in FIG. 4, in the NUMA management table, items such as a node ID, an ID of a CPU (CPU_ID) included in a node having the node ID, the start and end addresses of a memory of the node having the node ID are arranged in a predetermined order (for example, in an ascending order of node IDs) for each of the nodes.

In step S108, the BOOT CPU secures a storage area (tracer storage destination/trace information output destination storage area), in a memory module of the node where the BOOT CPU exists, for storing a correspondence between a storage area of a program (tracer) executing a trace and an output destination area of trace information output by the tracer for each CPU, in a memory of each of the nodes of the system.

Then, in step S109, each of the CPUs (including the BOOT CPU) of the system initializes the area for the tracer.

Figure 5:
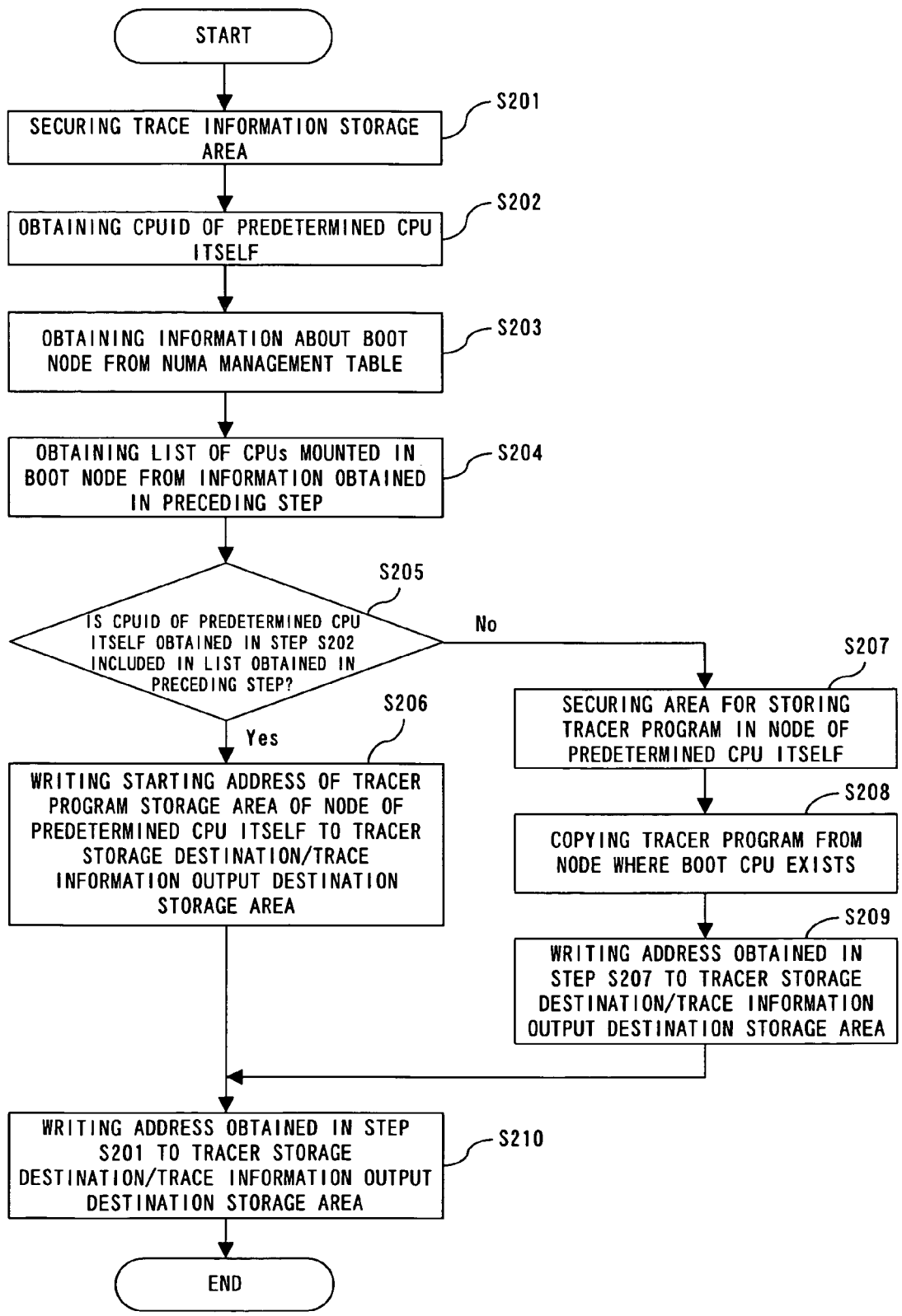
FIG. 5 is a flowchart showing the further details of a process in step S109 of FIG. 3.

FIG. 5 is a flowchart showing the further details of the process in step S109 of FIG. 3.

In this figure, at first, in step S201, a predetermined CPU among the one or more CPUs of the respective nodes firstly secures an area, to which trace information is output, in a primary storage area of the node of the predetermined CPU itself.

Next, in step S202, the predetermined CPU of the respective nodes each obtain the CPU_ID of itself. Then, in step S203, the predetermined CPU obtains information about the node where the BOOT CPU exists from the NUMA management table shown in FIG. 4. For example, the fact that the node ID of the node where the BOOT CPU exists is 0 is known to all of the CPUs (including the predetermined CPU), and the predetermined CPU obtains the information about the node having the node ID "0" from the NUMA management table.

In step S204, the predetermined CPU obtains a list of CPU_IDs (list of CPUs included in the node) within the information about the node, which is obtained in step S203.

Then, in step S205, the predetermined CPU determines whether or not the CPU_ID of the predetermined CPU itself is included in the list of the CPU_IDs, which is obtained in step S204.

In this preferred embodiment, the original of the tracer program exists within the memory module of the node where the BOOT CPU exists. Accordingly, if it is determined in step S205 that the CPU_ID of the predetermined CPU itself, which is obtained in step S202, is not included in the list of CPU_IDs, which is obtained in step S204, the tracer program must be copied from the node where the BOOT CPU exists to the node where the predetermined CPU itself exists. Namely, in this case, the predetermined CPU among the one or more CPUs, which exists in the node other than the node where the BOOT CPU exists, secures an area for storing the tracer program in the memory module of the node of the predetermined CPU itself in step S207.

Then, in step S208, the predetermined CPU among the one or more CPUs, which exists in the node other than the node where the BOOT CPU exists, copies the tracer program from the memory module of the node where the BOOT CPU exists.

In step S209, each of the CPUs, which exist in the node other than the node where the BOOT CPU exists, writes the area secured in step S207, namely, the starting address of the area for storing the tracer program to the above described tracer storage destination/trace information output destination storage area. Then, the flow proceeds to step S210.

Or, if it is determined in step S205 that the CPU_ID of the predetermined CPU itself, which is obtained in step S202, is included in the list of CPU_IDs, which is obtained in step S204, the tracer program is already stored in the memory module of the node of the predetermined CPU itself. Therefore, in step S206, each of the CPUs, which exist in the node where the BOOT CPU exists, writes the starting address of the area for storing the tracer program in the node of the CPU itself to the tracer storage destination/trace information output destination storage area. Then, the flow proceeds to step S210.

In step S210, each of the CPUs writes the starting address of the output destination area of the trace information, which is secured in step S201, within the memory module of the node to which the predetermined CPU itself belongs to the tracer storage destination/trace information output destination storage area.

FIG. 6 is a schematic showing the data structure of the tracer storage destination/trace information output destination storage area.

As shown in this figure, in the tracer storage destination/trace information output destination storage area, items such as CPU_ID (CPU number), a node ID (node number) of a node to which the CPU having the CPU_ID belongs, a pointer to an area for storing trace information, which is secured in the memory module of the node having the node ID, and a pointer to an area for storing the tracer that executes a trace process, which is secured in the memory module of the node having the node ID, are arranged in a predetermined order (for example, in an ascending order of CPU_IDs) for each CPU_ID.

Up to this point, the description has been provided up to step S109 of FIG. 3.

Referring back to the initialization process of FIG. 3.

In step S110 of FIG. 3, the BOOT CPU initializes a device driver of each type. Then, in step S111, the BOOT CPU generates an idle task. In step S112, the BOOT CPU generates a process that operates by default. In step S113, the BOOT CPU executes a task switch, namely, the scheduler.

A case where the trace process is executed for the NUMA system itself (OS itself) initialized as described above, or for a program running on the OS is described next.

Figure 7:
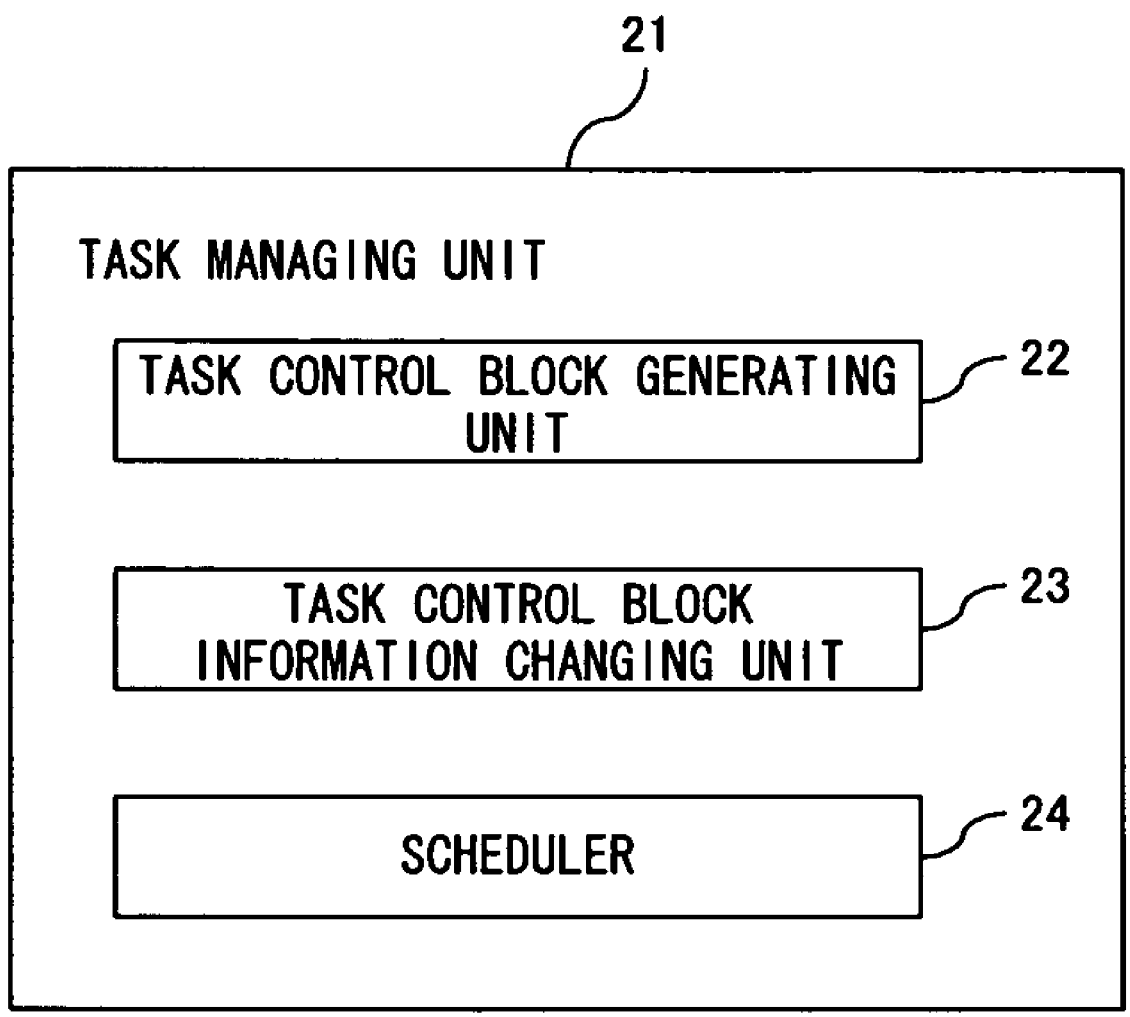
FIG. 7 is a diagram showing the configuration of a task management mechanism (task managing unit) according to the preferred embodiment.

FIG. 7 is a diagram showing the configuration of the task management mechanism (task managing unit) according to this preferred embodiment.

As shown in this figure, the task managing unit 21 comprises a task control block generating unit 22 for generating a task control block, which is information for managing a task (referred to also as a process or a job) based on a tracer storage destination/trace information output destination storage area, a task control block information changing unit 23 for changing information about a task control block, for example, when the transfer of the task is determined, and a scheduler 24 for allocating a CPU to a task.

FIG. 8 is a schematic showing the data structure of a task control block.

As shown in this figure, in the task control block, items such as CPU_ID (CPU number) of a CPU that is responsible for a task, a node ID (node number) of a node to which the CPU having the CPU_ID belongs, a pointer to an area for storing trace information, which is secured in a memory module of the node having the node ID, and a pointer to an area for storing the tracer that executes the trace process, which is secured in the memory module of the node having the node ID are arranged in a predetermined order (for example, in an ascending order of CPU_IDs) for each CPU_ID.

Figure 9:
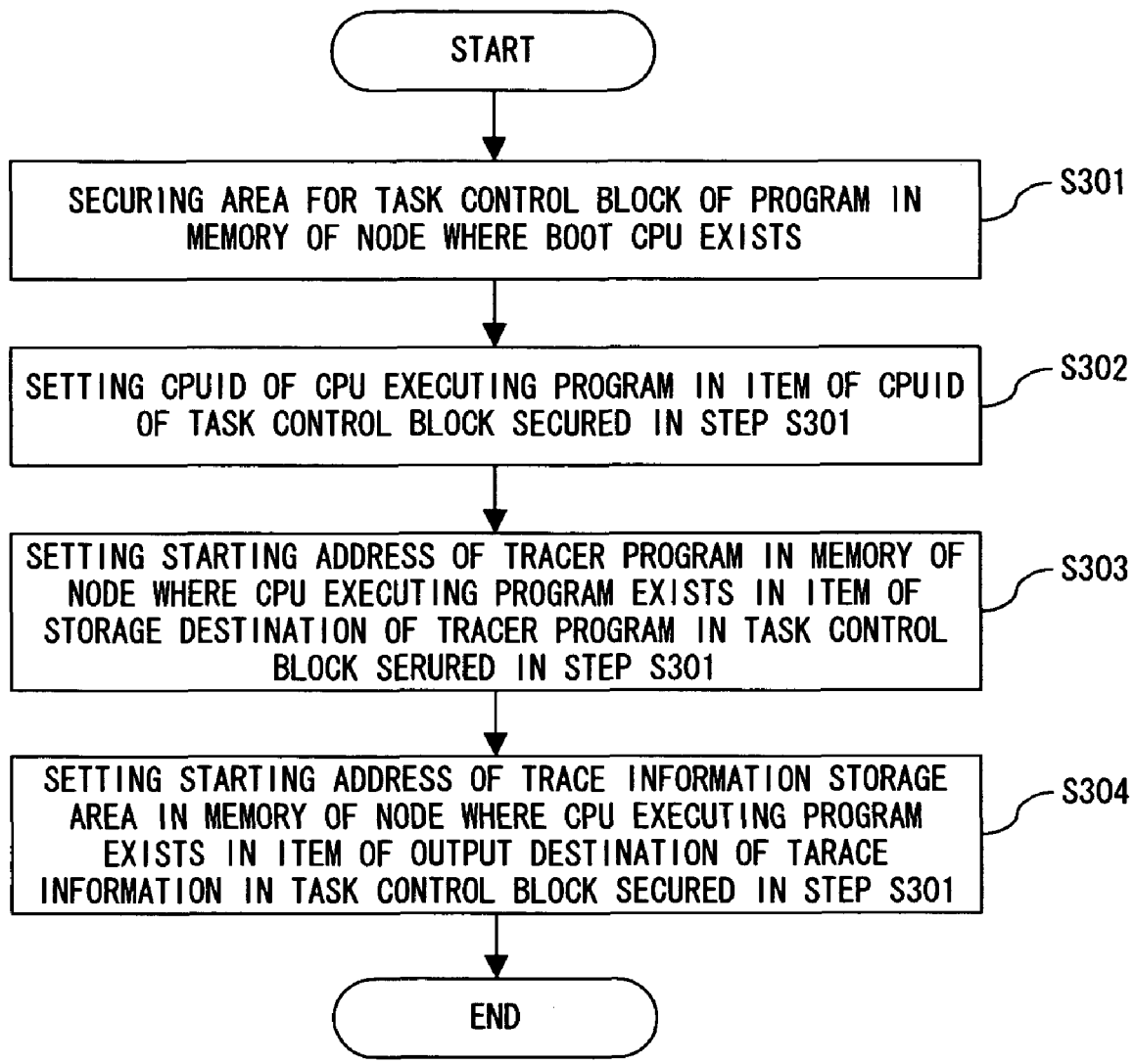
FIG. 9 is a flowchart showing a task control block generation process.

FIG. 9 is a flowchart showing a task control block generation process. This flowchart is executed in a way such that a CPU to which the scheduler 24 shown in FIG. 7 allocates the execution of the task control block generation process (this CPU normally matches a CPU that is responsible for the execution of the program) fetches and decodes the program from the memory module of the node where the program that executes the task control block generation process exists (normally, the node where the BOOT CPU exists).

Namely, in step S301 of FIG. 9, this CPU secures an area for a task control block of the program that the CPU executes, for example, in the memory module of the node where the BOOT CPU exists.

Then, in step S302, this CPU specifies a CPU that executes the program to be traced in the item of the CPU_ID of the secured task control block.

In step S303, this CPU specifies the starting address of the tracer program in the memory module of the node where the CPU, which is executing the program exists, in the item of the storage destination of the tracer program of the secured task control block.

In step S304, this CPU specifies the starting address of a trace information storage area in the memory module of the node where the CPU, which is executing the program exists, in the item of the output destination of trace information of the secured task control block.

Figure 10:
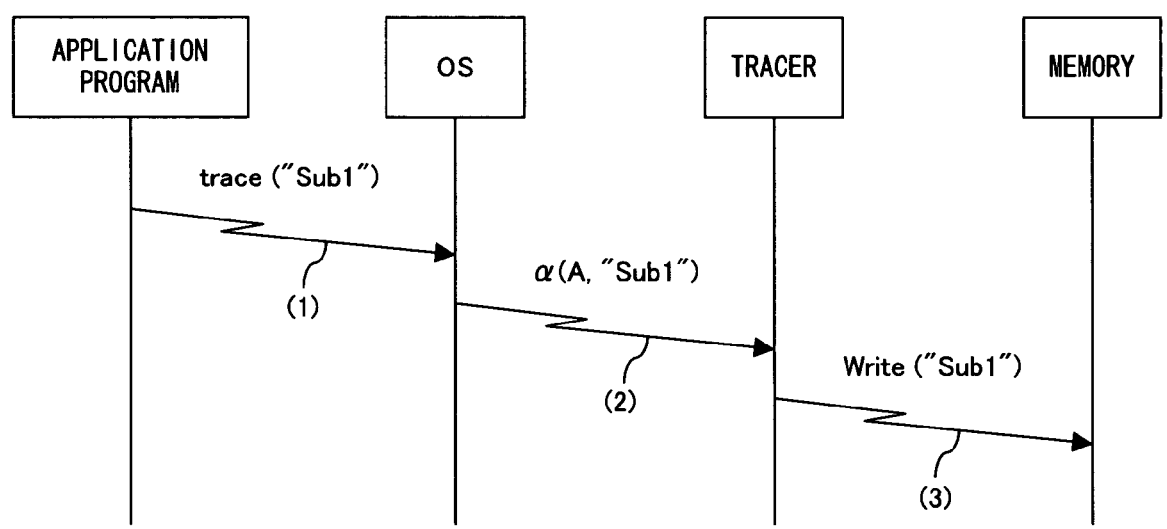
FIG. 10 is a schematic explaining a trace process executed for an application program running on an OS.

FIG. 10 is a schematic explaining the trace process executed for an application program running on the OS.

This figure assumes, for example, a case where entrance or exit to each subroutine of the application program is made, a mark indicating the entrance or exit is output as trace information. Namely, if the subroutine "Sub1" is entered while the application program is running, an instruction to output information "Sub1" as trace information is issued from the application to the OS in (1), as shown in FIG. 10.

Upon receipt of the instruction, the OS passes a pointer A to an area to which the trace information is to be written, and the information "Sub1" to be written to the write destination to a tracer α in (2). The tracer writes the passed information "Sub1" to the position of the specified pointer A in (3).

Figure 11:
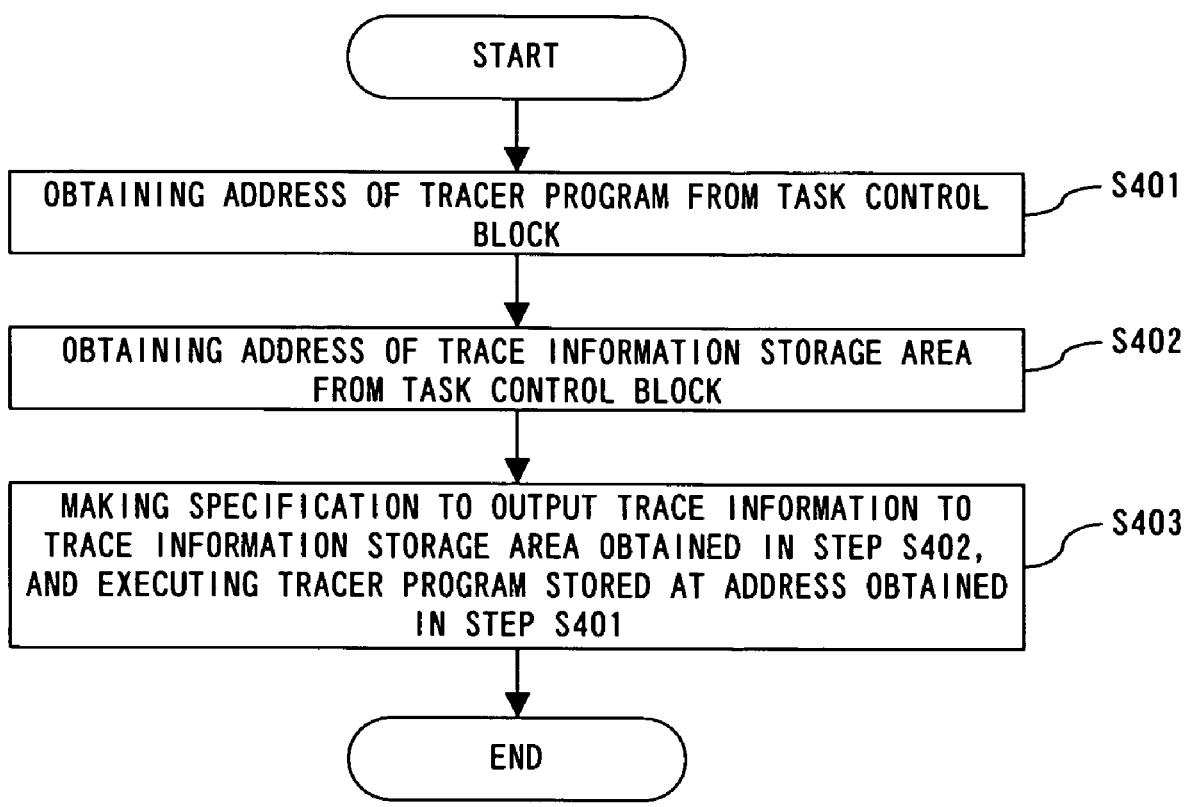
FIG. 11 is a flowchart showing a trace process executed for an OS itself or a program running on the OS.

FIG. 11 is a flowchart showing the trace process executed for the OS itself, or a program running on the OS. This process is executed by a CPU that is responsible for the execution and the trace of the program.

In this figure, in step S401, the responsible CPU obtains the address of the tracer program from the task control block of the program that the responsible CPU executes. A variety of methods exist as the method with which the task control block generating unit 22 shown in FIG. 7 generates a task control block. For example, if the task control block generating unit 22 generates a task control block in a memory module of a node where the BOOT CPU exists, a list of task control blocks is generated in that memory module. The list is searched, whereby the task control block corresponding to the program that the responsible CPU itself executes can be obtained.

Next, in step S402, the responsible CPU obtains the address of a trace information storage area from the task control block of the program that the responsible CPU executes.

Then, in step S403, the responsible CPU makes specification to output trace information to the trace information storage area obtained in step S402, and the tracer program at the address obtained in step S401 is made to execute.

A case where the scheduler determines to transfer a task, for example, when the task restores from waiting for an IO, time, the making available of a memory space, etc. is described next.

FIG. 12 is a flowchart showing the process executed when the scheduler determines to transfer a task. This flowchart is executed by a CPU that is responsible for the task before the transfer is determined (a transfer source CPU), and a transfer destination CPU.

In this figure, at first, in step S501, the scheduler of the OS notifies the transfer source CPU of the transfer destination CPU.

Upon receipt of this notification, the transfer source CPU overwrites the item of the CPU, which is responsible for the task, in the task control block corresponding to the task to be transferred with the CPU_ID of the transfer destination CPU in step S502.

Then, in step S503, the transfer source CPU obtains the address of a tracer program storage area of the transfer destination CPU from a tracer storage destination/trace information output destination storage area, which exists in a memory module of the node where the BOOT CPU exists.

In step S504, the transfer source CPU overwrites the item of the pointer to the area for storing the tracer in the task control block corresponding to the task to be transferred with the address of the tracer program storage area obtained in step S503.

Then, in step S505, the transfer source CPU obtains the address of the trace information storage area of the transfer destination CPU from the tracer storage destination/trace information output destination storage area.

In step S506, the transfer source CPU overwrites the item of the pointer to the area for storing trace information in the task control block corresponding to the task to be transferred with the address of the trace information storage area obtained in step S505.

Then, the transfer source CPU that completes the process in step S506 issues a trap, which indicates that preparation for resuming the task has been made at the transfer destination, to the transfer destination CPU.

The transfer destination CPU receives this trap, and resumes the task in step S507.

What is claimed is:

1. A method for tracing a program executed on a system having a plurality of nodes which are interconnected by a bus, and each of which includes at least one processing unit and a primary storage area to which the processing unit makes an access when executing a trace process, the method comprising:

securing, by a predetermined processing unit, a tracer storage destination/trace information output destination storage area that stores information regarding a correspondence between a storage destination of a tracer in a primary storage area and an output destination of trace information in a primary storage area for each processing unit, in a primary storage area of a node corresponding to the predetermined processing unit;

securing by each processing unit an area to which the trace is output in the primary storage area of the node corresponding to the processing unit;

securing by a processing unit other than processing unit of the node having a storage source area of the tracer that executes a trace, an area for storing the tracer in the primary storage area of the node corresponding to the processing unit, copying the tracer from the storage source area of the tracer to the secured area;

writing by each processing unit, information about an output destination area of trace information and about the storage destination area of the tracer of the processing unit to the tracer storage destination/trace information output destination storage area;

writing, by the processing unit that is responsible for a task, information for identifying the responsible processing unit, and the storage destination of the tracer and the output destination of the trace information which correspond to the responsible processing unit, to a task control block based on information stored in the tracer storage destination/trace information output destination storage area when the task control block of the program to be traced is generated;

obtaining, by the responsible processing unit, the storage destination of the tracer and the output destination of the trace information from the task control block of the program when the program to be traced is executed; and executing, by the responsible processing unit, the tracer stored in the obtained storage destination of the tracer, and outputting the trace information to the obtained output destination.

2. The method according to claim 1, further comprising:

securing, by a predetermined processing unit, a system configuration information storage area that stores information regarding a correspondence between a node and processing unit comprised by the node, in a primary storage area of the node of the predetermined processing unit; and writing, by each processing unit, information about the processing unit to the system configuration information storage area, and verifying whether or not the predetermined processing unit exists in a node having the storage source area of the tracer based on information stored in the system configuration information storage area, when securing of the area for storing the tracer that executes the trace in the primary storage area of the node corresponding to the predetermined processing unit is executed.

3. A method for tracing a program executed on a system having a plurality of nodes which are interconnected by a bus, and each of the nodes includes at least one processing unit and a primary storage area to which the processing unit makes an access when executing a trace process, the method comprising:

securing, by a predetermined processing unit, a tracer storage destination/trace information output destination storage area for storing information regarding a correspondence between a storage destination of a tracer and an output destination of trace information in a primary storage area for each processing unit, in a primary storage area of a node corresponding to the predetermined processing unit;

securing, by each processing unit, an area to which the trace information is output, in the primary storage area of the node corresponding to the processing unit;

securing, by a processing unit other than a processing unit of the node where a storage source area of the tracer that executes a trace exists, an area for storing the tracer in a primary storage area of the node corresponding to the processing unit;

copying the tracer from the storage source area of the tracer to the secured area;

writing, by each processing unit, information about the output destination area of the trace information and information about the storage destination area of the tracer of the processing unit to the tracer storage destination/trace information output destination storage area;

writing, by a processing unit that is responsible for a task, information for identifying the responsible processing unit, and the storage destination of the tracer and the output destination of the trace information which correspond to the responsible processing unit to a task control block based on the tracer storage destination/trace information output destination storage area when the task control block of the program to be traced is generated; and rewriting, by a transfer source processing unit that is responsible for a task, a responsible processing unit written in the corresponding task control block to a transfer destination processing unit, and rewriting the storage destination of the tracer and the output destination of the trace information written in the corresponding task control block to a storage destination and an output destination which correspond to the transfer destination processing unit, when a transfer of the task is determined.

4. A system having a plurality of nodes which are interconnected by a bus and each of which is configured by one processing unit and a primary storage area to which the processing unit makes an access when executing a trace process, wherein:

an area to which trace information is output, and an area for storing a tracer that executes a trace are provided in a primary storage area of each of the nodes;

a tracer storage destination/trace information output destination storage area which makes a correspondence between a storage destination of the tracer and an output destination of the trace information in the primary storage area corresponding to each of the plurality of processing units, is further provided in a primary storage area of a predetermined node among the plurality of nodes;

a processing unit that is responsible for a task writes information for identifying the responsible processing unit, and the storage destination of the tracer and the output destination of the trace information which correspond to the responsible processing unit, to a task control block based on information stored in the tracer storage destination/trace information output destination storage area, when the task control block of the program to be traced is generated;

the responsible processing unit obtains the storage destination of the tracer and the output destination of the trace information from the task control block of the program when the program to be traced is executed; and the responsible processing unit fetches and executes the tracer from the obtained storage destination of the tracer, and outputs the trace information to the obtained output destination.

5. A system having a plurality of nodes which are interconnected by a bus and each node having at least one processing unit and a primary storage area to which the processing unit makes an access when executing a trace process, wherein:

an area to which trace information is output, and an area for storing a tracer that executes a trace are provided in a primary storage area of each of the nodes;

a tracer storage destination/trace information output destination storage area which makes a correspondence between a storage destination of the tracer and an output destination of the trace information in the primary storage area corresponding to each of the plurality of processing units, is further provided in a primary storage area of a predetermined node among the plurality of nodes;

a processing unit that is responsible for a task writes information for identifying the responsible processing unit itself, and the storage destination of the tracer and the output destination of the trace information, which correspond to the responsible processing unit itself, to a task control block based on the tracer storage destination/trace information output destination storage area when the task control block of the program to be traced is generated; and a transfer source processing unit that is responsible for a task rewrites a responsible processing unit stored in the task control block to a transfer destination processing unit, and rewrites the storage destination of the tracer and the output destination of the trace information stored in the task control block to a storage destination and an output destination which correspond to the transfer destination processing unit, when a transfer of the task is determined.

* * * * *